July 5, 1960

S. LOEWE ET AL 2,943,808

MAGNETIC TAPE REEL

Filed Oct. 8, 1956

Inventors:
Siegmund Loewe
Werner Zorn 2,943,808
Patented July 5, 1960

2,943,808

MAGNETIC TAPE REEL

Siegmund Loewe, 68 Ridge Road, Yonkers 5, N.Y., and Werner Zorn, Schillerstrasse 5, Berlin-Zehlendorf-West, Germany Filed Oct. 8, 1956, Ser. No. 614,766

Claims priority, application Germany Oct. 11, 1955

5 Claims. (Cl. 242—74.1)

Figure 1:
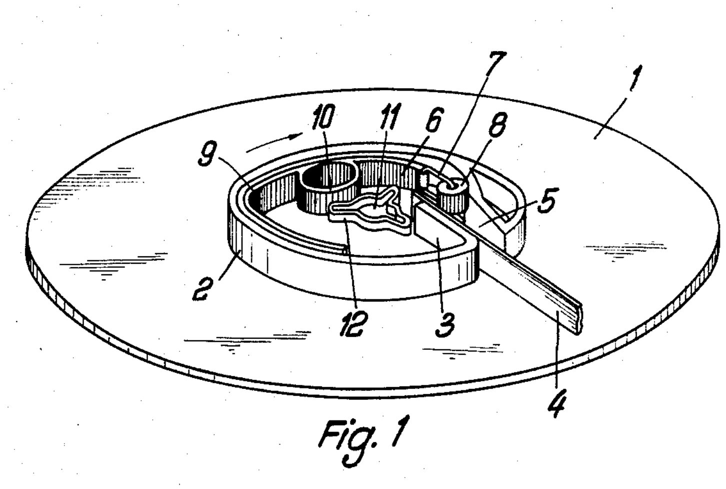

Reels for tapes, preferably for magnetic recording tapes, are known in which the end of the tape to be wound up—this end being brought between the reel flanges into the body of the reel—is fastened by a clamping device. This clamping device is formed so that, when a pull is exercised on the tape with an outward effect, it is not possible to pull out the end of the tape since the force holding the tape increases the more tension is applied to the tape with outward effect. This is, in particular, attained by means of a wedging effect of the fastening device.

The most important field of application for such reels with clamping fastening for tapes is for those tape recorders, in particular, magnetic tape recorders, which use multi-track tapes and face the problem of permitting the immediate reversal of the running direction of the tape, when the tape is completely wound off on one of the tracks, and, also a corresponding switch-over or shifting of the magnetic heads, if this is necessary. This switch-over is effected by the tape tension when the reel is completely wound off or by alterations in the direction of this tape tension and naturally presupposes that the end of the tape is not loosened from the body of the reel when completely wound off.

The known means for bridging about the described fastening of the tape end with wedging effect consist of a clamping piece with spring effect provided in the body of the reel which, in its normal position, clamps the tape end or presses it against a fixed bearing surface arranged e.g. radially in the inside of the reel and is subject to a wedging effect so that the clamping force is increased with the increase in the tape tension.

For the purpose of bringing the end of the tape between the parts which are clamped together or for removing the end of the tape when changing it, means are provided which effect a temporary removal of the clamping piece from the tape end when and so long as a force is effective, applied from the outside, e.g. by movement of the clamping device by the finger of the user. However, so long as this force applied from the outside is not effective, the tape end is tightly connected to the clamping device, that is mainly during the rotation of the reel when the set is in operation so that the user cannot interfere with the clamping device of the reel.

However, in practical operation, it is often necessary to loosen the tape end when the reel is fully wound up, without resistance from the body of the reel—namely so long as no automatic tape switch-over is to take place for the purpose in question. This is especially the case when the user has switched the recorder to high speed, in order, for example, to find quickly a place lying on another tape track. Since the automatic switch-over means, mentioned at the beginning, do not perfectly function at high speed which is 10 to 20 times faster than the normal speed, then a tearing of the tape or other damage to the gear unit of the recorder would be unavoidable if the end of the tape were held tight just as the tape had been completely wound off the body of the reel at high speed.

The present invention overcomes these disadvantages. It consists of a clamping piece for a tape reel of the type mentioned above which has a clamping device for the tape end operating under a wedging effect which clamping piece is movable so that, as desired, it can remain in the retaining position as also in the release position. It is left to the decision of the user as to whether the tape wound up on the reel is run off so that the end remains clamped on completed reel-off or so that it frees itself, without resistance, from the body of the reel, according to whether an automatic switch-over at normal speed is to result or, for example, a complete reel-off of the tape at high speed.

The best means for carrying out the solution according to the invention consist in using a clamping piece, clamping the end of the tape, e.g. against a fixed bearing surface, to the body of the reel, with stop means or these stop means can be provided on another place but operate with the clamping piece so that no matter what the position of the tape winding, a constant retaining or release position of the clamping piece is attained.

Figure 2:
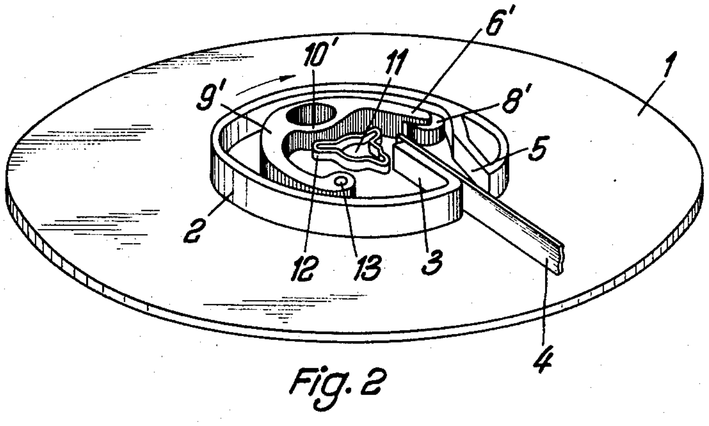

The principle of the invention with various possibilities of design and details as to these is shown in the appended diagram containing—by way of examples: in Fig. 1 the interior of a reel body with the constructional parts for clamping the end of a magnetic tape, in Fig. 2 the interior of a reel body with other constructional parts for clamping the end of a magnetic tape.

In Figure 1, a magnetic tape reels is represented. Of this, the lower flange 1 and the hollow formed body of the reel 2 can be seen.

The body of the reel 2 is usually covered at the top by a preferably transparent plate which may be joined together with the top reel flange. In order to form a fastening of the tape end to the reel body 2 which can, if necessary, be released, a bearing surface 3 is provided which projects somewhat radially into the inside of the reel body and can, for example, be a continuation of the outer wall of the reel body. The end of a magnetic tape 4 is placed on this bearing surface. The clamping device for this tape end consists of the following parts: A slanting surface 5 also provided on the body of the reel is so arranged that its distance from the bearing surface 3 increases towards the inside of the reel. Then, a clamping piece 6, preferably with spring action, is provided which is connected via a yoke 7 or similar to a clamping roller 8 made from e.g. rubber. This clamping roller 8 rests on one side on the end of the tape 4 and on the other side on the slanting surface 5 in such a way that, with tension on the tape operating outwards, the clamping effect is increased so that, when the tape is completely wound off at normal speed, the end of the tape is not released.

However, in order that it is possible for the tape end to be released from the body of the reel 2 without resistance when this is required, e.g. when the tape is fully wound off at high speed, the following means are provided in accordance with the invention: The clamping piece 6, designed, for example, as a spring, is secured on a carrier 9 which makes a swivel action possible, preferably around the reel axle and is guided during the swivel movement by the body of the reel 2, e.g. so that the carrier 9 rests on the inner surface of the wall of the reel body 2. This carrier 9 or also the clamping piece 6 itself is now provided, in accordance with the invention, with a spring part which, in connection with other immovable parts of the reel brings about a stop effect so that the clamping parts 6 or 8 of the device remain either constantly in the retaining position or constantly in the release position until another position is attained by adjustment from outside. These stop means consist, according to Figure 1, of a ring 10 with spring action which is provided on the clamping piece 6 or on its carrier 9 or on the boundary between these two pieces and is so formed and arranged that, on being shifted in a peripheral direction it engages in one of the two grooves which in this example are formed by the axle bush 11 forming a part of the body of the reel or its radial shoulder pieces 12. These radial shoulder pieces 12 in magnetic tape reels of the usual type of construction serve to hold the radial coupling pieces provided on the axial part of the reel disc which is not shown in the diagram.

In the design according to Figure 1, the ring 10 with spring action rests between the shoulder piece 12 shown on the left and the round part of the axle bush 11 which is connected to the right. This position corresponds to a release of the tape 4 between the bearing surface 3 and the clamping roller 8. If now the ring 10 is swivelled peripherally in the direction of the arrow by, for example, the finger of the user, then the round outer edge of this ring with spring action engages in the next hollow which is on the axle bush 11, i.e. on the left side of the shoulder piece 12 which points backwards. In this position, the rubber roller 8 clamped between the surfaces 3 and 5 exerts a pressure and holds the tape tight against a tension operating from outside, by means of a wedging effect. The user can thus decide either to use the last-mentioned retaining position of the device 6, 7, 8, 9 in particular when an automatic reversal of the tape movement is to result after the tape has been wound off, or to adjust the position of the clamping device as in the diagram, for example, before he switches the recorder to high speed.

The type shown in Figure 2 differs from that given in Figure 1 mainly in that the clamping piece 6′ or its carrier 9′ cannot be swivelled along the wall of the reel body 2 but is arranged rotatably around an axle 13 and this axle 13 is arranged eccentrically to the reel axle but still within the body of the reel 2. In this model, a spring-action stop can be brought about either by making, as in Figure 1, the adjusting ring 10′ with spring-action on the side which points to the reel axle and thus engaging again in the described manner between the bush 11 and the shoulder pieces 12, or by forming the body 6′, 9′ completely or mainly inelastic and achieving the spring effect, necessary for the engagement, by the parts 11 and 12 or by fitting the parts 6′ and 9′ on the axle of rotation 13.

A further difference to the type shown in Figure 1 lies, in Figure 2, in the fact that the yoke 7 between the clamping piece 6′ and the clamping roller 8′ is left out.

In both types, an opening or slit is provided in the top lid of the reel body 2 which is of such size and so arranged that it is possible to push through it the parts 6, 9 (6′, 9′) by means of the ring piece 10 (10′) in the direction of the arrow or in the opposite direction.

Finally, the models represented can be subjected to certain alterations within the framework of the idea of this invention, for example in the shaping of the clamping means 6, 8 or the clamping surfaces 3, 5. The reel itself, in particular the parts of the clamping device arranged in the body of the reel 2 can be made from metal with spring-action or from suitable plastic material.

What we claim is:

1. A magnetic tape reel containing a core with a slot parallel to the reel axis, a bearing surface for the tape end introduced through said slot, and a slanting surface for a clamping member arranged on both margins of said slot, both surfaces being directed into the interior of said core, a clamping member being arranged between said surfaces and shiftable into one of two positions in the first of which said clamping member is removed from said bearing surface for introducing said tape end, and in the second of which said clamping member is pressed between said surfaces thereby arresting said tape end, said clamping member being secured on a carrier arranged in said reel core and shiftable into two positions corresponding with the positions of said clamping member, said carrier containing a stop means, said core provided with a second stop means, both said stop means being adapted to engage with one another in such a manner that said clamping member is fixed in each of its two positions.

2. In a magnetic tape reel according to claim 1, said stop means comprising a ring secured on said carrier, and an axle bush forming a part of said reel core, said axle bush containing at least two shoulders forming at least two grooves between one another, said ring and said grooves being adapted to engage with one another.

3. In a magnetic tape reel according to claim 1, said carrier being curved and circumferentially shiftable along the inner wall of said core.

4. In a magnetic tape reel according to claim 1, said carrier being pivotally fastened on an axle arranged in said core parallel to its axis.

5. In a magnetic tape reel according to claim 1, said clamping member consisting in a roll, the surface of which is of rubber and the axis of which is arranged parallel to the reel axis.

References Cited in the file of this patent

UNITED STATES PATENTS

| | | |
|---|---|---|
| 1,209,593 | Keiser | Dec. 19, 1916 |
| 2,352,042 | Vander Linde | June 20, 1944 |
| 2,390,894 | Morse | Dec. 11, 1945 |